United States Patent Office 3,193,577
Patented July 6, 1965

3,193,577
CATALYZED SO₂ OXIDATION OF AROMATIC SIDE CHAINS
Alan John Shipman, Northwich, England, assignor to Imperial Chemical Industries Limited, London, England, a corporation of Great Britain
No Drawing. Filed Oct. 19, 1962, Ser. No. 231,851
Claims priority, application Great Britain, Nov. 1, 1961, 39,088/61
9 Claims. (Cl. 260—524)

This invention relates to a process for oxidizing sidechains in aromatic compounds to give the corresponding carboxylic acids, in which the oxidation is brought about by means of sulphur dioxide at elevated temperatures and pressures, and particularly to catalysts for such a process.

In U.S. Serial No. 104,541, filed April 21, 1961, now Patent No. 3,124,611, dated March 10, 1964, there is described a process whereby side-chains in aromatic compounds, for example in lower alkyl substituted benzenes such as toluene, xylenes, pseudocumene, benzaldehyde, bibenzyl, and various lower alkyl substituted naphthalenes such as α-methyl naphthalene, can be oxidized to obtain the corresponding carboxylic acids by heating the aromatic compound with sulphur dioxide at a temperature of 200°–400° C. and under a pressure of 100–400 atmospheres. Batchwise the process gives yields of the order of 90% of the acid, for example benzoic acid from toluene, the phthalic acids from xylenes, trimellitic acid from pseudocumene.

It has now been found that this oxidation reaction is catalyzed by small but catalytically effective amounts of bromine and iodine and their compounds.

Thus, according to this invention a process for making aromatic carboxylic acids comprising subjecting a mixture of sulphur dioxide and an aromatic compound having one or more oxidizable side-chains attached to the nucleus, such as a lower alkyl substituted benzene or a lower alkyl substituted naphthalene, to the action of elevated temperatures and superatmospheric pressures is characterised in that present in the reaction mixture is a catalyst chosen from the group consisting of bromine, iodine, compounds of bromine and compounds of iodine.

Examples of such catalysts in addition to elementary bromine and iodine are hydrogen bromide, hydrogen iodide, sodium, potassium, ammonium, manganese and cobalt bromides; hydrogen iodide, potassium and sodium iodides; isopropyl bromide, bromoform, isopropyl iodide, i.e., alkyl bromides and iodides containing not more than three carbon atoms. Particularly effective is hydrogen bromide.

A convenient proportion of catalyst is from 0.10 to 1.0% by weight of the hydrocarbon, and with amounts of this order the reaction rate may be as much as ten times that of the uncatalyzed reaction. Higher proportions of catalyst than 1.0% may be used but their effects are not substantially greater.

The oxidations of toluene to benzoic acid and of the xylenes to the phthalic acids by means of sulphur dioxide are relatively free of side-reactions, and uncatalyzed they are capable of high yields even when brought about at high temperatures of the order of 350°–400° C. in order to promote fast rates of reaction. When the number of sidechains is three or more the probability of side-reactions occurring at high temperatures increases, and yields tend to be lower owing to degradation and carbon formation, as for example in the oxidation of pseudocumene to trimellitic acid and of durene to pyromellitic acid. To avoid these side-reactions and carbon formation it is necessary to carry out the oxidation at temperatures as low as possible, for example 200°–300° C., but at such temperatures uncatalyzed reaction rates are slow. By means of the catalysts of the invention however it is possible to increase reaction rates at these low temperatures to a satisfactory level, and hence to obtain good yields without wastage due to side-reactions and degradations.

The ability to obtain satisfactory reaction rates and yields at the lower temperatures of the range by the use of the catalysts is of further advantage in oxidations of alkyl-substituted naphthalenes by sulphur dioxide. For example, at temperatures of the order of 300°–310° C. dimethyl naphthalenes when oxidized by sulphur dioxide at a pressure of about 300 atmospheres tend to split at the junction of the two benzene nuclei and give benzene tricarboxylic acids rather than naphthalene dicarboxylic acids. At lower temperatures of the order of 250°–260° C. however, at which the catalyst enables satisfactory reaction rates to be achieved, the tendency towards splitting of the naphthalene structure is much less, and satisfactory yields of the naphthalene dicarboxylic acids can be obtained.

In the following Examples Nos. 1–15 show the effect of various catalysts on the oxidation of pseudocumene to trimellitic acid; Nos. 16–18 show the effect of hydrogen bromide on the oxidations respectively of toluene to benzoic acid, m-xylene to iso-phthalic acid, and durene (1,2,4,5-tetramethyl benzene) to pyromellitic acid. Examples 19–22 show how at the lower temperatures hydrogen bromide as catalyst enables naphthalene dicarboxylic acids to be made from dimethyl naphthalenes. In each case the hydrocarbon and catalyst were placed in a high-pressure vessel which was then charged with sulphur dioxide up to a pressure of about 300 atmospheres and heated to maintain a reaction temperature between about 250° C. and 290° C. To maintain the pressure which, owing to sulphur dioxide being consumed, would otherwise fall during the reaction, further sulphur dioxide was compressed into the vessel from time to time over a period of several hours until reaction was complete as indicated by no further drop in pressure.

*Examples 1–15*

| Temp., °C. | Catalyst | Amount of catalyst, percent by wt. of the hydrocarbon | Ratio: catalyzed reaction rate uncatalyzed reaction rate |
|---|---|---|---|
| 285 | HBr | 2.5 | 8 |
| 275 | HBr | 1.25 | 6 |
| 275 | HBr | 0.25 | 6 |
| 260 | HBr | 1.0 | 10 |
| 250 | HBr | 1.0 | 10 |
| 240 | HBr | 1.0 | (1) |
| 275 | KBr | 5.0 | 4 |
| 275 | CoBr₂ | 5.0 | 4 |
| 285 | Br₂ | 5.0 | 5 |
| 285 | HI | 2.5 | 5 |
| 285 | NH₄Br | 2.5 | 5 |
| 285 | I₂ | 2.5 | 4 |
| 285 | Isopropyl bromide. | 2.5 | 6 |
| 285 | CHBr₃ | 2.5 | 10 |
| 285 | Isopropyl iodide. | 2.5 | 6 |

[1] Uncatalyzed reaction rate too slow for measurement.

*Examples 16–18*

| Temp., °C. | HBr concentration, percent by wt. of the hydrocarbon | Hydrocarbon | catalyzed reaction rate / uncatalyzed reaction rate |
|---|---|---|---|
| 275 | 1 | Toluene | 4 |
| 260 | 1 | m-Xylene | 6 |
| 250 | 1 | Durene | 5 |

*Examples 19–22*

| Temp., °C. | Catalyst | Hydrocarbon | Yield of naphthalene carboxylic acids |
|---|---|---|---|
| 300 | None | 2,6-dimethyl naphthalene. | Negligible. |
| 300 | do | 2,7-dimethyl naphthalene. | Do. |
| 250 | HBr [1] | 2,6-dimethyl naphthalene. | 42% 2,6-naphthalene dicarboxylic acid. |
| 250 | HBr [1] | 2,7-dimethyl naphthalene. | 40% 2,7-naphthalene dicarboxylic acid. |

[1] 1% by wt. of hydrocarbon.

What I claim is:

1. A process for preparing an aromatic carboxylic acid which comprises reacting a mixture of sulphur dioxide and an aromatic hydrocarbon selected from the group consisting of a lower alkyl substituted benzene and a lower alkyl substituted naphthalene at a temperature within the range of 200° to 400° C. and a pressure within the range of 100 to 400 atmospheres, the reaction being carried out in the presence of a catalyst selected from the group consisting of bromine, iodine, hydrogen bromide, hydrogen iodide, sodium bromide, potassium bromide, ammonium bromide, manganese bromide, cobalt bromide, potassium iodide, sodium iodide and alkyl bromides and iodides containing not more than 3 carbon atoms.

2. A process as claimed in claim 1 in which the amount of catalyst is from 0.10 to 1.0% by weight of the hydrocarbon.

3. A process as claimed in claim 1 in which the aromatic hydrocarbon is a methyl-substituted naphthalene, the temperature is from 200° to 260° C., and the catalyst is hydrogen bromide.

4. A process as claimed in claim 1 in which the aromatic hydrocarbon is a methyl-substituted benzene.

5. A process as claimed in claim 4 in which the temperature is from 200° to 300° C. and the catalyst is hydrogen bromide.

6. A process as claimed in claim 5 in which the aromatic compound is 1,2,4-trimethyl benzene.

7. A process as claimed in claim 5 in which the aromatic compound is a xylene.

8. A process as claimed in claim 5 in which the aromatic hydrocarbon is toluene.

9. A process as claimed in claim 5 in which the aromatic hydrocarbon is 1,2,4,5-tetramethyl benzene.

References Cited by the Examiner

UNITED STATES PATENTS

| | | | |
|---|---|---|---|
| 2,415,800 | 2/47 | Rust et al. | 260—524 |
| 2,444,924 | 7/48 | Farkas | 260—523 |
| 2,662,923 | 12/53 | Reeder | 260—524 |
| 2,821,552 | 1/58 | Strickland et al. | 260—524 |
| 2,900,412 | 8/59 | Toland | 260—524 |
| 3,124,611 | 3/64 | Shipman | 260—523 |

LORRAINE A. WEINBERGER, *Primary Examiner.*

LEON ZITVER, *Examiner.*